(12) United States Patent
Ivanov et al.

(10) Patent No.: US 6,341,150 B1
(45) Date of Patent: Jan. 22, 2002

(54) FISSILE MATERIAL DETECTOR

(75) Inventors: Alexander I. Ivanov; Vladislav I. Lushchikov; Eugeny P. Shabalin; Nikita G. Maznyy; Michael M. Khvastunov, all of Dubna (RU); Mark Rowland, Alamo, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/608,778

(22) Filed: Jun. 30, 2000

(51) Int. Cl.⁷ ................................................. G21G 4/02
(52) U.S. Cl. ........................................................ 376/159
(58) Field of Search ................................. 376/159, 191, 376/257; 250/494.1, 492.1

(56) References Cited

U.S. PATENT DOCUMENTS

| | | | | |
|---|---|---|---|---|
| 3,310,676 A | * | 3/1967 | Haram | |
| 3,736,429 A | * | 5/1973 | Foley | |
| 3,786,256 A | * | 1/1974 | Untermyer | |
| 4,483,816 A | * | 11/1984 | Caldwell et al. | |
| 4,617,466 A | * | 10/1986 | Menlove et al. | |
| 4,620,100 A | * | 10/1986 | Schoenig et al. | |

* cited by examiner

Primary Examiner—Charles T. Jordan
Assistant Examiner—Tien Dinh
(74) Attorney, Agent, or Firm—L. E. Carnahan; Alan H. Thompson

(57) ABSTRACT

A detector for fissile materials which provides for integrity monitoring of fissile materials and can be used for nondestructive assay to confirm the presence of a stable content of fissile material in items. The detector has a sample cavity large enough to enable assay of large items of arbitrary configuration, utilizes neutron sources fabricated in spatially extended shapes mounted on the endcaps of the sample cavity, incorporates a thermal neutron filter insert with reflector properties, and the electronics module includes a neutron multiplicity coincidence counter.

20 Claims, 2 Drawing Sheets

FISSILE MATERIAL DETECTOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention to monitors the integrity of fissile materials, particularly to a fissile material detector, and more particularly to a fissile material detector having a sample cavity capable of monitoring the content of fissile materials in large items, uses neutron sources fabricated in spatially extended shapes mounted in endcaps of the sample cavity, a thermal neutron filter insert, and a neutron reflector insert, and a neutron multiplicity coincidence counter.

Various types of detectors for fissile materials are known, as exemplified by U.S. Pat. No. 4,201,912, issued May 6, 1980; U.S. Pat. No. 4,510,117 issued Apr. 9, 1985; and U.S. Pat. No. 4,617,466, issued Oct. 14, 1986. Gamma spectrometer detectors, which determine the amount and isotopic composition of fissile materials from the intensity and shape of the measured gamma spectrum, can be considered as an analog. The use of such a prior known detector is limited to small items of homogeneous composition (weight of about 100 grams), since the characteristic gamma radiation of fissile materials is not of very high energy (up to 200 keV) and the penetration depth of such gamma photons is no more than a few millimeters.

Fast neutrons have significant penetrating ability (20–30 cm) for irradiating items made from fissile materials. So containers of about 200 liters volume may be scanned by the system such as the active-well neutron coincidence counters, exemplified by a Model JCC-51, made by Canberra Industries, Inc., Meriden, Conn, in which the sample cavity is monitored by $^3$He-filled neutron detectors. Also see "Active Nondestructive Assay of Nuclear Materials, Principles and Applications" January 1981. The characteristic neutron emission upon spontaneous fission of such materials as uranium-235 and plutonium-239 is extremely low, and so the above-referenced neutron detectors of fissile materials are mainly used to detect plutonium-240 and small uranium-235 samples.

Thus, a need has existed for a fissile material detector which can be effectively utilized to detect uranium-235 and plutonium-239, and wherein the volume of the sample cavity is sufficiently large to enable nondestructive assay of large items of arbitrary configuration.

The present invention provides a solution to the above-referenced need by providing a fissile material detector having operating principles very close to the above-referenced active-well coincidence counter.

In the detector of the present invention, the assay sample is placed in a cylindrical cavity of 35 liters volume, for example, surrounded by a polyethylene neutron moderator, with $^3$He-filled neutron counters positioned within the moderator. A thermal neutron filter insert of boron carbide extends around the cavity and is key to increasing the energy of the neutron flux in the cavity, thus improving uniformity of sample irradiation. The sample is irradiated by distributed Am—Li neutron sources from both endcaps of the cavity, inducing fission uniformly in uranium-235 or plutonium-239.

SUMMARY OF THE INVENTION

It is an object of the present invention to provide an improved fissile material detector.

A further object of the invention is to provide a fissile material detector having a sample cavity volume large enough to make non-destructive assay possible for large items of arbitrary configuration.

A further object of the invention is to provide a fissile material detector for integrity monitoring of fissile materials, and for nondestructive assay to confirm the presence of a stable content of fissile materials in items.

Another object of the invention is to provide a fissile material detector having a sample cavity volume increased by about an order of magnitude.

Another object of the invention is to provide a fissile material detector which utilizes Am—Li neutron sources fabricated in spatially extended shapes, such as flat rings, and mounted on the endcaps of the sample cavity.

Another object of the invention is to provide a fissile material detector which utilizes Am—Li neutron sources composed of a large americium layer (i.e. ~75 cm) pressed against a large lithium layer.

Another object of the invention is to provide a fissile material detector which utilizes a thermal neutron insert with reflector properties, such as boron carbide, located around the sample cavity to provide higher penetration neutrons for a more uniform neutron interrogation.

Another object of the invention is to provide a fissile material detector having an electronics module which includes a neutron multiplicity coincidence counter.

Another object of the invention is to provide a fissile material detector wherein the neutron emission enables use with materials such as uranium-235 and plutonium-239 in large sizes.

Other objects and advantages of the present invention will become apparent from the following description and accompanying drawings. Basically the invention involves a fissile material detector capable of detecting uranium-235 and plutonium-239. Thus, the invention relates to monitoring the integrity of various fissile materials and may be used for nondestructive assay to confirm the presence of a stable content of fissile materials in items or objects. The detector of this invention utilizes a sample cavity which is about an order of magnitude larger than any known active well coincidence counter. The detector utilizes Am—Li neutron sources fabricated in spatially extended shapes, such as flat rings, mounted on the endcaps of the sample cavity. The detector utilizes a thermal neutron filter about the sample cavity, which may be made of boron carbide and which functions to block the thermal neutron flux from the sample cavity, and as a reflector for fast neutrons, increasing their flux and uniformity inside the cavity. The electronics module of the detector includes a neutron multiplicity coincidence counter, which consists of an adder, an adjustable delay generator, a binary counter, a register, and a controller, and thus it is possible to compile a multiparameter assay certificate for the item under test.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
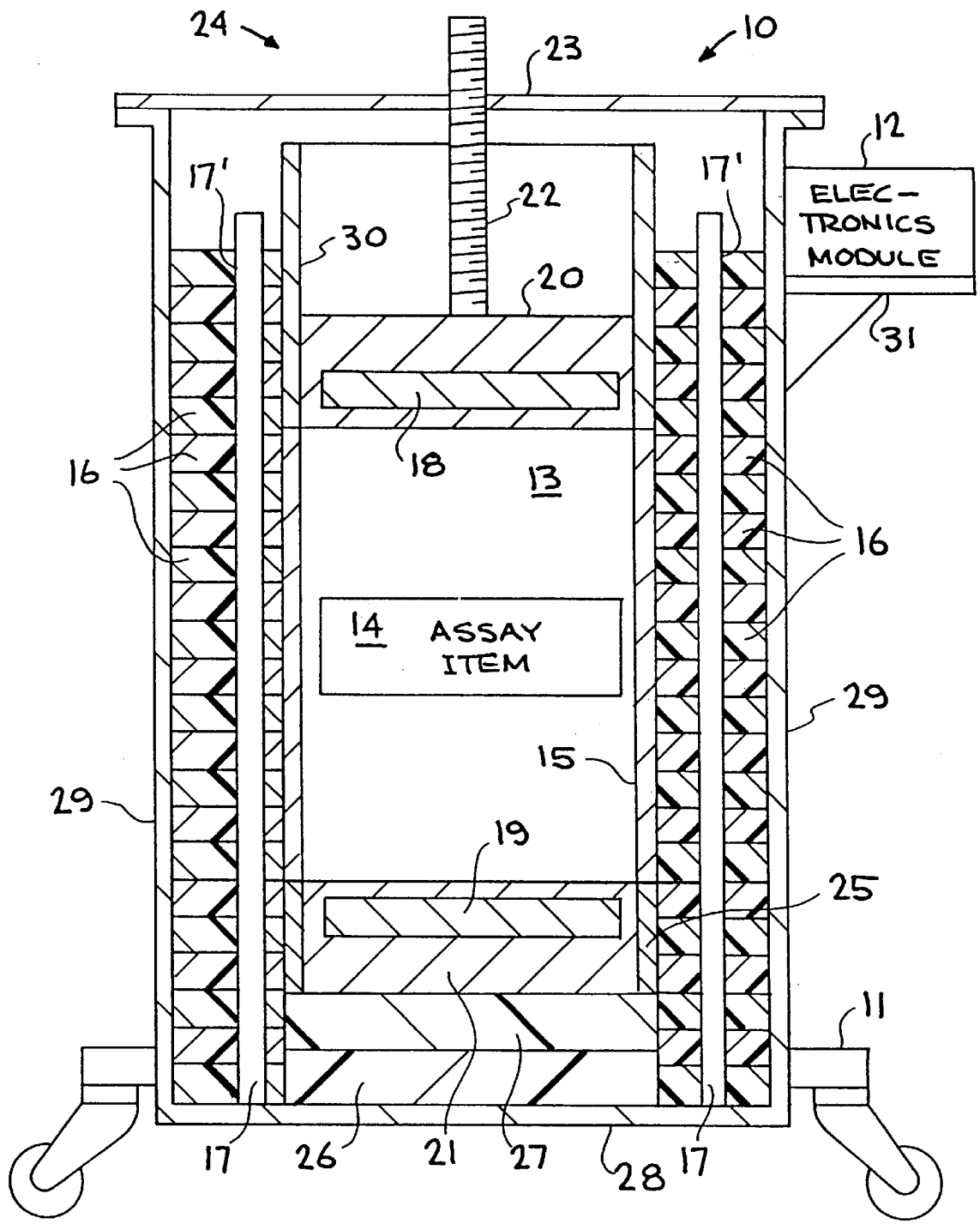
FIG. 1 is a partial cross-sectional view of an embodiment of a fissile material detector made in accordance with the present invention.

The present invention is directed to an improved fissile material detector. As pointed out above, the operating principle of this invention is close to the operating principle of the above-referenced active-well coincidence counter. The detector of this invention has four (4) primary features that enable its use for the detection of uranium-235 or plutonium-239, as well as plutonium-240. These four primary features comprise: (1) a sample cavity having a volume increase of about an order of magnitude greater; (2) Am—Li neutron sources fabricated in spatially-extended shapes and located at the endcaps of the sample cavity; (3) a thermal neutron filter and spectrum hardener made of boron carbide; and (4) an electronics module which includes a neutron multiplicity coincidence counter. These four features provide integrity monitoring for fissile materials and the detector can be used for nondestructive assay to confirm the presence of a stable content of fissile materials in items or objects, including large items of arbitrary configuration.

The sample cavity of the present detector has been built and experimentally tested, and this embodiment involved a volume of 35 liters which is an order of magnitude greater than the prior detectors. The spatially-extended shapes, such as in the form of flat rings, of the Am—Li neutron sources mounted on the endcaps of the sample cavity provide uniformity in the neutron flux irradiating the item under test in the increased volume sample cavity. The boron carbide thermal neutron filter insert performs a dual function: (1) blocking of the thermal neutron flux from the cavity to the surrounding detector, and (2) acts as a reflector for fast neutrons, increasing their flux and uniformity inside the cavity. The neutron multiplicity coincidence counter provides the result of compiling a multiparameter assay certificate for the item under test, and includes an adder, an adjustable delay generator, a binary counter, a shift register, and a controller, as seen in FIG. 2.

In the fissile material detector of the prior detectors, the assay sample is placed in a cylindrical cavity having a volume of about 2 liters surrounded by a polyethylene neutron moderator, with $^3$He-filled neutron counters positioned within the moderator. The sample is irradiated by practically point Am—Li neutron sources from both endcaps of the cavity, inducing fission of uranium-235 or plutonium-239. Since the fission process is accompanied by simultaneous (correlated) escape of several neutrons, detection of two or more neutrons during the neutron lifetime (i.e. in an approximately 60 micro seconds interval) is unambiguously associated with the presence of fissile materials in the sample, since the Am—Li source itself emits only uncorrelated single neutrons. The major measurement error comes from the spatial nonuniformity of the neutron flux from the Am—Li point sources, which imposes substantial restrictions on the size of the sample cavity and accordingly on the allowable external dimensions of the samples. Furthermore, any inhomogeneties in the composition or nonuniformities in the structural features of the assay samples may substantially affect the calibration of the detectors and require additional measurements with structurally similar references.

The objective of this invention is to eliminate these above referenced disadvantages of the prior detectors and to expand the functional capabilities of the detector for determining the presence of fissile materials in large items.

Figure 2:
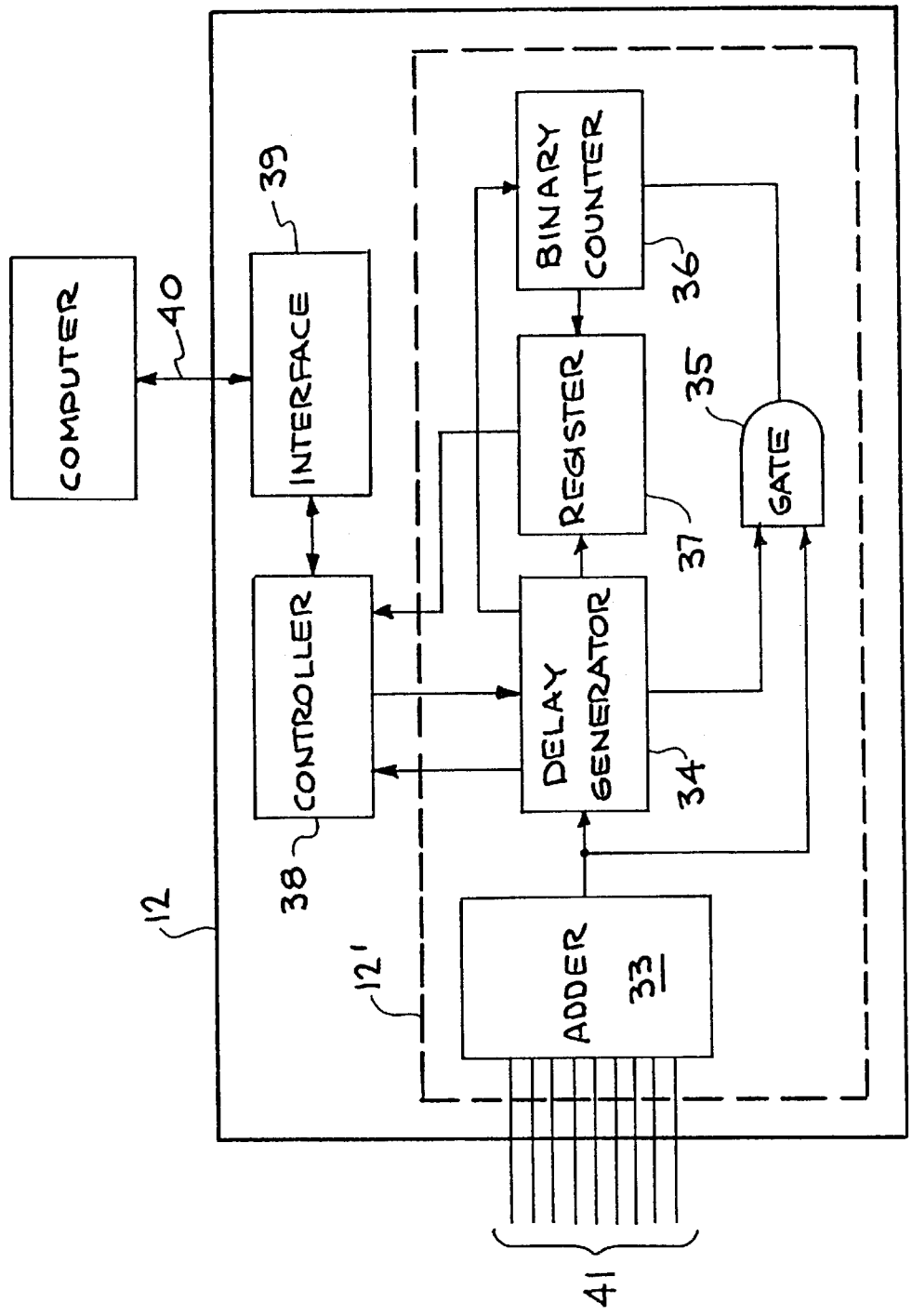
FIG. 2 is a block diagram of the electronics module of the FIG. 1 embodiment which includes the neutron multiplicity coincidence counter of the invention and the components thereof.

Referring now to the drawings, FIG. 1 illustrates in cross-section an embodiment of a fissile material detector of this invention, which is generally indicated at 10, mounted on a wheeled assembly or rolling platform 11 and connected to an electronics module 12 including a neutron coincidence counter, the components of which are shown in FIG. 2. As shown, the detector 10 comprises a cylindrical sample cavity 13 having an assay item 14 positioned therein, cavity 13 being surrounded by a thermal neutron filter insert 15, for example, boron carbide, and a plurality of stacked neutron moderator rings 16, of polyethylene, for example. Helium-3 neutron counters 17, only two shown, are located in holes 17' in the moderator rings 16 and in spaced relation around the sample cavity 13, and consist of two rows or rings, and each row or ring may contain 30 to 50 counters 17. A pair of neutron sources 18 and 19 located at opposite ends of sample cavity 13 are of a spatially-extended shape, such as in the form of a flat ring, and are preferably composed of Am—Li, and attached to endcaps generally indicated at 20 and 21, with endcap 20 being connected to a threaded lifting rod or member 22 that extends through a threaded opening of a member 23 attached to a frame assembly generally indicated at 24, whereby movement of endcap 20 moves the source 18 with respect to sample cavity 13. Endcap 21 is mounted to the source 19 and around which is a liner or sleeve 25 and below which are plugs or removable members 26 and 27 which are supported by a bottom member 28 of the frame assembly 24, the moderator rings 16 being retained within a casing or sleeve 29 of frame assembly 24. The frame assembly 24 additionally includes a sleeve or cylinder 30 through which endcap 20 and source 18 are movable to enable insertion or removal of the assay item 14; and the assembly 24 additionally includes a support member 31 on which the electronics module 12 is mounted.

By way of example, the endcaps 20 and 21 may be composed of polyethelene, with the sleeve 25 and the support members 26 and 27 composed of polyethylene, wood or plastic. Also by way of example, the sample cavity 13, as shown in FIG. 1, has a diameter of 320 mm and height of 540 mm, with the thermal neutron filter insert 15 having a thickness of 1 cm to 3 cm, and may additionally be composed of borax or borasic acid. In this embodiment the moderator rings 16 may be composed of hydrogenous materials including polyethelene, water, or other water based material, and comprise 22 in number and may have a height of up to 1 meter with an external diameter of up to 1 meter and an internal diameter of up to 32 cm, depending on the desired cavity size. Also, in this embodiment there are 42 helium-3 filled neutron counters 17 but this number may vary and may have diameters of ½ to 4 inches and lengths of ½ to 1 meter. The total efficiency of the 42 counters 17 with respect to fission neutrons emitted by the sample cavity is about 33%.

The neutron sources 18 and 19 are preferably composed of pressed Am—Li washers, but may be composed of sintered Am—Li or powdered Am—Li, and the sources are fabricated as flat rings mounted on the endcaps 20 and 21 of the sample cavity 13, and uniformly irradiate the assay item 14 with neutrons. The sources 18 and 19 each consists of a neutron generator, a hermetically sealed capsule, and a copper reflector. The neutron generator has the shape of a ring with outer diameter of 280 mm and inner diameter of 100 mm, and is constructed as follows: americium (Am) deposited as a thin layer on a nickel substrate is tightly pressed against metallic lithium (Li) of a thickness ≈1 mm. Neutron generation occurs when alpha particles emitted by Am interact with lithium nuclei. The neutron source generator is enclosed in a hermetically sealed metallic capsule composed of stainless steel, zirconium, or uranium, with a diameter of 286 mm and height of 31 mm. The source is hermetically sealed under an argon atmosphere. The working side of the source (adjacent the sample cavity) is the smooth surface of the capsule. The copper reflector is screwed on to the nonworking side of the source. A steel bushing, for example, comprising endcap 20 is attached to one of the sources 18, allowing the lifting rod 22 to be fastened to the source 18. Both sources 18 and 19 are enclosed in a polyethylene shell of a height of 130 mm, diameter of 318 mm, and thickness of 20 mm. The polyethylene shell is surrounded by a cadmium sheet and has detachable cadmium lids. The intensity of each source is 2000 neutrons/sec.

The neutron moderator, in this embodiment, is made from rings 16 of polyethylene and in a circular cylinder of height 1050 mm with outer diameter 600 mm and inner diameter 354 mm in the embodiment shown. Within the moderator are two rings or rows of vertically extending holes 17' located at diameters 410 mm and 490 mm. Each ring or row of holes has, in this embodiment 21 holes 17'. The diameter of each hole 17' is 31 mm. The $^3$He counters 17 are placed in the holes 17'. The polyethylene moderator rings 16 are mounted in casing 29, made of aluminum, for example, with the cylindrical casing 29 fastened to rolling platform 11 and closed a the top by a lid 23, made of aluminum, which is mounted to said frame assembly 24. The aluminum cylinder or casing 29 has a detachable box, not shown, at the top for holding the pre-amplifiers (nine in this embodiment) of the $^3$He counters 17. The bottom of the moderator rings 16 is capped with the removable plugs 26 and 27 made of polyethylene and each of a diameter of 353 mm and height of 195 mm. Since the detector can be operated in four (4) modes, each mode has its own set of configurational filter inserts 15, and the length of the sample cavity 13 is changed by removing one or both plugs 26 and 27.

The measuring electrons system, which is not illustrated in detail except for the neutron coincidence counter module in FIG. 2, includes nine pre-amplifiers, a high-voltage switch, a power splitter for the pre-amplifiers, a NIM crate, two five-input differential discriminators, a high voltage module, and power supply for the crate. The $^3$He counters operate in a proportional mode. The supply voltage for the counters is +1500~2000V, with the operating supply voltage of +1700V. The $^3$He counters gas pressure is 2 atmospheres, the diameter of the counters is 30 mm with a height of 1050 mm. The counters register charged particles generated as a result of capture of a thermal neutron by the helium-3, according to the reaction:

$$^3\text{He}+n \rightarrow p+H$$

Referring now to FIG. 2, the electronics module 12 includes a neutron multiplicity coincidence counter module 12' having an adder 33, delay generator 34, gate 35, binary counter 36, register 37, controller or CPU 38 and interface (RS-232) 39 which is connected to a computer as indicated by arrow 40. The adder 33 receives nine (9) signals indicated by arrows 41 from the nine pre-amplifiers for the Helium-3 neutron counters via discriminators and the output from adder 33 is directed into delay generator 34 and into gate 10 as indicated by the arrows, and the signals are thus processed as indicated by the arrows to and from various components, as shown in FIG. 2.

The $^3$He counters are selected and grouped according to signal amplitude at the operating voltage +1700V. The $^3$He counters are numbered, and each occupies the corresponding position in the moderator block. The signals from the $^3$He counters are sent to the nine numbered pre-amplifiers. Each pre-amplifier has five inputs. Signals from five counters are sent to each pre-amplifier. The high voltage on the $^3$He counters is supplied through the pre-amplifiers. The pre-amplifiers, the high-voltage splitter and the power splitter for the pre-amplifiers are placed on the internal side of the electronics box in the moderator block. Coincidences are registered by the electronics module 12 within a time window of adjustable length (optimal length, 64 micro seconds), opened by the next neutron to be registered. The multiplicity of the coincidences is determined by the number of neutrons registered within the time window.

One sign of the presence of fissile material in an item is emission of several neutrons simultaneously upon fission of its atomic nuclei. The rate of these events depends on the mass of fissile material. The detector is designed to register neutron multiplicity. The device operates as follows: neutrons emitted by the Am—Li sources induce fission of the atomic nuclei in the sample. Fast neutrons emitted by the sample are slowed down to thermal velocities and then are either trapped in the detector or escape from it. Because of the high cross section (5700 barns) for capture of thermal neutrons in the reaction $^3$He+n→p+H, a significant fraction of the neutrons are registered by the $^3$He counters. The response of the instrument to an event with simultaneous emission of several neutrons is a pulse train that is correlated with respect to time of appearance according to the distribution of neutron lifetimes in the detector. The mean lifetime of a neutron in the detector is about 50 micro seconds. Signals sent from the $^3$He counters to the pre-amplifiers are linearly amplified and sent to the differential discriminators. The shape of the pulses from all the counters are similar: they have the shape of an symmetric peak with prolonged fall-off on the low amplitude side. The differential discriminators select the amplitudes falling within the region of the peak. The nine signals from the discriminators are sent through the adder to the input of the gate generator, which is triggered by the first pulse passing through and opens the gate for passage of the pulses to the input of the five-bit counter. When the delay time has elapsed, the generator stops the pulse count and transfers the number of counted pulses from the counter to the register, followed by reset of the counter and generation of the query signal for the controller. Thus the circuit is back in the original state and ready for a new measurement. The controller, triggered from the gate generator, reads the number of pulses from the register and does the primary processing.

The circuit includes protection from reading the wrong data: the gate generator does not go through the cycle of rewriting the data from the counter to the register if the data from the register has not been read by the controller.

After primary processing, the data can be read through the serial interface 39 to the computer 40 for further processing. The computer collects and processes the data. The background of accidental coincidences is calculated using the formula $$N_n = N_{s(w/\tau)}{}^{n-1} \exp(-w/\tau)/(n-1),$$

Where $N_n$ is the number of accidental coincidences of multiplicity n w is the length of the time window for registration of coincidences $$N_s \sum_{n=2}^{4} N_n^6$$

is the number of triggers of the time window, $N_n^6$ is the measured number of n-tuple coincidences $\tau = T/N_1$ is the average separation between pulses for registration of single neutrons, where T is the measurement time, $N_1$ is the number of neutrons registered in time T.

As a result, for each item the counting rate is determined for single neutrons, double, triple, and quadruple coincidences for registration of neutrons by the counters within a time window equal to the lifetime of neutrons in the system.

The data sets on said count rates constitute the assay record for the items, characterizing the presence of specific fissile materials.

It has thus been shown that the present invention provides a fissile material detector capable of detecting various fissile materials including uranium-235 and plutonium-239. The volume of the sample cavity is increased by an order of magnitude, and can be varied by removable end plugs, and this makes nondestructive assay possible for large items of arbitrary configuration, which could not be accomplished by the prior known active well coincidence counters. The detector, in a preferred embodiment, utilizes a pair of spatially-extended shaped sources, such as flat rings, made of Am—Li, a thermal neutron filter insert of boron carbide, and an electronics module which includes a neutron multiplicity coincidence counter.

While a specific embodiment of the fissile material detector has been illustrated and described, and specific materials and parameters have been set forth to exemplify and teach the principles of the invention, such are not intended to be limiting. Modifications and changes may become apparent to those skilled in the art, and it is intended that the invention be limited only by the scope of the appended claims.

What is claimed is:

1. A fissile material detector including:
   a sample cavity located within a cylinder of neutron moderator material,
   a pair of endcaps located within said cylinder defining ends of said sample cavity,
   at least one of said endcaps being movable,
   a pair of spatially extended shaped neutron sources mounted in said pair of endcaps,
   a plurality of neutron counters being located in said neutron moderator material,
   said sample cavity having a thermal neutron filter insert having reflector properties about side walls thereof, and
   an electronics module operatively connected to said plurality of neutron counters.

2. The fissile material detector of claim 1, wherein said cylinder of neutron moderator material is composed of a number of members selected from the group consisting of stacked rings of neutron moderator material and large, solid machined blocks of neutron moderator material.

3. The fissile material detector of claim 2, wherein said stacked rings are composed of hydrogenous materials selected from the group consisting of polyethylene, water and coke.

4. The fissile material detector of claim 1, wherein said pair of spatially extending shaped neutron sources are of a flat ring configuration.

5. The fissile material detector of claim 4, wherein said neutron sources are composed of material selected from the group consisting of Am—Li washers, sintered Am—Li, and powdered Am—Li.

6. The fissile material detector of claim 1, wherein one of said endcaps is connected to a threaded assembly for moving the endcap.

7. The fissile material detector of claim 1, wherein said plurality of neutron counters are composed of $^3$He tubes ranging from diameters of ½ inch to 4 inch and lengths of ½ to 1 meter.

8. The fissile material detector of claim 1, wherein said plurality of neutron counters are located in at least one row of holes in said neutron moderator material.

9. The fissile material detector of claim 1, wherein said thermal neutron filter insert is composed of material selected from the group consisting of boron carbide, borax, and borasic acid.

10. The fissile material detector of claim 1, wherein said electronics module includes a neutron coincidence counter.

11. The fissile material detector of claim 10, wherein said neutron coincidence counter includes an adder, a delay generator, a gate, a binary counter, a register, a controller, and an interface adapted to be connected to a computer.

12. The fissile material detector of claim 1, additionally including at least one removable plug located within said neutron moderator material and adjacent one of said endcaps, whereby removal of said at least one removable plug causes a change in volume of said sample cavity.

13. The fissile material detector of claim 12, wherein said removable plug is composed of neutron moderator material.

14. In a fissile material detector having a cylindrical neutron moderator material and endcaps defining therein a sample cavity, neutron counters located in said moderator material, a pair of neutron sources mounted in said endcaps, and an electronics module operatively connected to said neutron counters, the improvement including:
   said neutron sources being constructed of spatially extended shapes.

15. The improvement of claim 14, wherein said spatially extended shapes are in the form of flat rings mounted to said endcaps.

16. The improvement of claim 14, additionally including a thermal neutron filter insert located adjacent to said neutron moderator material about side wall surfaces of said sample cavity.

17. The improvement of claim 14, wherein said sample cavity is adjustable in size and is of a size having at least a volume of six liters.

18. The improvement of claim 14, wherein said electronics module includes a neutron multiplicity coincidence counter for multiplicities greater than 2.

19. The improvement of claim 14, wherein said spatially extended shaped neutron sources each consists of a neutron generator, a hermetically sealed capsule, and a copper reflector.

20. The improvement of claim 19, wherein said neutron generator is formed by americium deposited as a thin layer on a nickel substrate and is tightly pressed against metallic lithium of a thickness of >1 mm.

* * * * *

UNITED STATES PATENT AND TRADEMARK OFFICE
CERTIFICATE OF CORRECTION

PATENT NO.     : 6,341,150 B1
DATED          : January 22, 2002
INVENTOR(S)    : Ivanov et al.

It is certified that error appears in the above-identified patent and that said Letters Patent is hereby corrected as shown below:

<u>Title page,</u>
Item [*] Notice, delete the phrase "by 0 days" and insert -- by 14 days --

Signed and Sealed this

Twenty-first Day of September, 2004

JON W. DUDAS
*Director of the United States Patent and Trademark Office*